United States Patent [19]

Pradt et al.

[11] 4,174,280
[45] Nov. 13, 1979

[54] OXIDATION PROCESS

[75] Inventors: Louis A. Pradt, Wausau; Wayne B. Gitchel, Rothschild, both of Wis.

[73] Assignee: Sterling Drug Inc., New York, N.Y.

[21] Appl. No.: 953,270

[22] Filed: Oct. 20, 1978

Related U.S. Application Data

[63] Continuation of Ser. No. 489,237, Jul. 17, 1974, abandoned, which is a continuation-in-part of Ser. No. 295,230, Oct. 5, 1972, abandoned.

[51] Int. Cl.$^2$ ................................................ C02C 5/04
[52] U.S. Cl. .................................. 210/60; 210/63 R; 210/71
[58] Field of Search .................. 210/10, 50, 63 R, 67, 210/71, 177, 178, 180, 60

[56] References Cited

U.S. PATENT DOCUMENTS

| | | | |
|---|---|---|---|
| 3,256,179 | 6/1966 | Teletzke et al. | 210/63 R |
| 3,272,740 | 9/1966 | Gitchel et al. | 210/63 R |
| 3,449,247 | 6/1969 | Bauer | 210/63 R |
| 3,661,778 | 5/1972 | Pradt | 210/63 R |
| 3,761,409 | 9/1973 | McCoy et al. | 210/63 R |
| 3,772,181 | 11/1973 | Cole et al. | 210/63 R |
| 4,013,560 | 3/1977 | Pradt | 210/63 R |

*Primary Examiner*—Thomas G. Wyse
*Attorney, Agent, or Firm*—Thomas L. Johnson; B. Woodrow Wyatt

[57] ABSTRACT

A process for wet air oxidation of liquid or solid combustible materials which are insoluble, immiscible and difficult to suspend in water which comprises injecting said materials directly into the wet air oxidation reactor, thereby producing a regular, safe and trouble-free reaction.

4 Claims, 2 Drawing Figures

OXIDATION PROCESS

This application is a continuation of application Ser. No. 489,237, filed July 17, 1974, abandoned, which is a continuation-in-part of our application, Ser. No. 295,230, filed Oct. 5, 1972, now abandoned.

The invention relates to a process for wet air oxidation of liquid or solid combustible materials which are insoluble, immiscible and difficult to suspend in water.

Liquid and solid combustible waste materials are conventionally disposed of by incineration methods. However, conventional burning of some materials such as explosives can be dangerous, and incineration of materials containing toxic substances may cause pollution of the atmosphere. Moreover, many waste materials contain too much moisture to burn easily in a conventional incinerator but still have a high solids content, up to 50% solids by weight.

Wet air oxidation provides a valuable alternative to conventional incineration for materials having the drawbacks just described. Wet air oxidation of waste products of high solid content requires dilution with water so that there is enough water present to absorb the heat released during wet oxidation by causing the water to be heated or vaporized. However, many waste solids and liquids are largely insoluble, immiscible and difficult to suspend or emulsify in water, and this creates problems in conventional wet air oxidation systems as hereinafter described.

The figures show the prior art and the improvement of the present invention.

Figure 1:
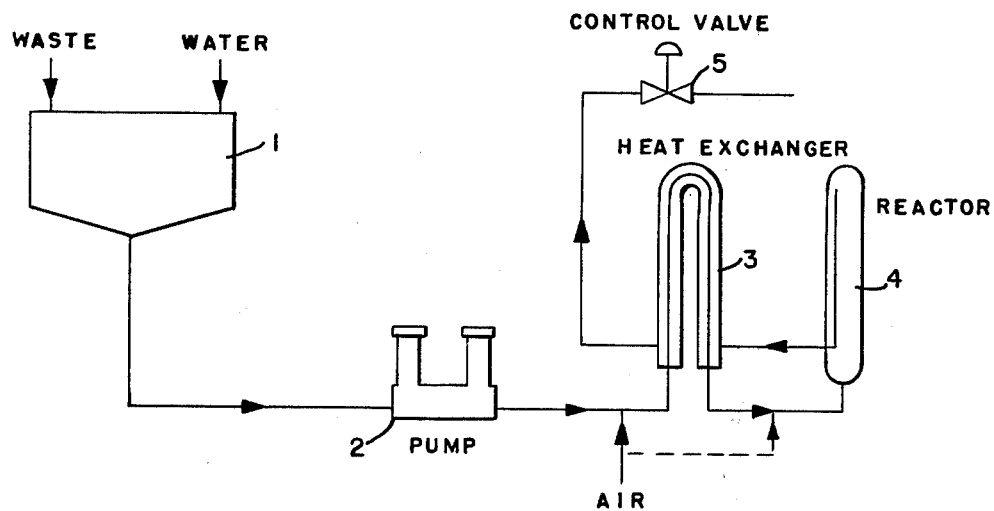

In a conventional wet air oxidation system shown in FIG. 1, the waste material is added to water in a storage tank 1; then the mixture of waste and water is pumped by means of a high pressure pump 2 through a heat exchanger 3, oxygen or air being mixed with the water stream either before or after the heat exchanger. Thereafter, the entire mixture of waste, water and air is passed into a sealed reactor 4 where the organic portion of the waste material is partially or completely oxidized at elevated temperature and pressure by a controlled autogenic and self-sustaining reaction (U.S. Pat. Nos. 2,824,058; 2,903,425). The oxidized products then pass out of the reactor, through the heat exchanger 3 and are discharged from the system through a control valve 5. However, if the waste material is insoluble, immiscible and difficult to suspend or emulsify in water, it will tend to coalesce and sink to the bottom or rise to the top of the storage tank 1. Even with violent agitation it is difficult to maintain a homogeneous mixture in the storage tank. During operation, the material pumped into the reactor 4 will be alternately very concentrated in waste material, and then very dilute. This renders the wet oxidation system operation very irregular and possibly uncontrollable and dangerous if large slugs of waste are pumped into the reactor accompanied by little water which could produce sudden bursts of heat resulting in possible explosions.

Figure 2:
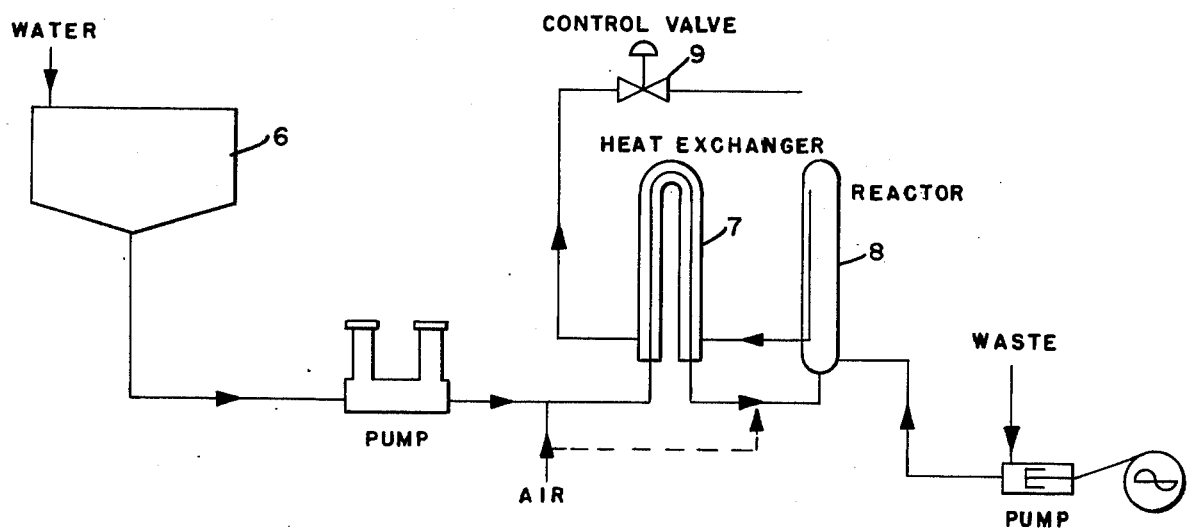

The object of the present invention is to provide a system for wet air oxidation of liquid or solid combustible waste material which are insoluble, immiscible and difficult to suspend or emulsify in water while eliminating the problem of maintaining a consistent slurry in the storage tank. In the system of this invention, shown in FIG. 2, the waste material is injected directly into the sealed reactor containing an aqueous medium instead of being mixed with water in the storage tank. In FIG. 2 the storage tank 6 contains only water which is pumped through the heat exchanger 7 into the reactor 8. Additional heat exchangers and/or reactors can be inserted in the system if desired. Oxygen or air is introduced into the water stream prior to entering the heat exchanger. Alternatively, the oxygen or air can be added after the heat exchanger, that is, directly into the reactor. The waste material is metered into the sealed reactor containing an aqueous medium at such a rate to provide a controlled steady oxidation rate. In the case of a pumpable liquid waste, the waste or "fuel" can be pumped into the system with any of a variety of known metering devices. In the case of a solid waste, the waste can be fed with a dry feeder or pumped in as a very heavy slurry, for example, the slurry resulting from allowing a granular type of solid to settle in a tank of water with no agitation. By this process a smooth and trouble-free oxidation operation is realized.

The waste material to be oxidized can, if desired, be heated independently before injecting it into the reactor, but an advantage of the invention lies in the fact that such preheating is not required.

As in conventional wet air oxidation systems the temperature of the reactor is preferably between 100° and 375° C. and the internal pressure between 150 and 4,000 psig, sufficient to maintain most of the water in the liquid phase.

The aqueous medium in the sealed reactor can be plain water or an aqueous solution or suspension itself amenable to controlled wet air oxidation. For example, sewage sludge or waste sulfite liquor, which is oxidized in conventional wet oxidation systems, can be stored in the storage tank 6 and pumped through the system. The immiscible solid or liquid waste is then added directly to the sludge or solution in the reactor, thereby fortifying the sludge or solution being oxidized.

The invention thus comprises a process for oxidizing by wet air oxidation an oxidizable material which is insoluble, immiscible and difficult to suspend or emulsify in water, which comprises injecting said material directly into a sealed reactor containing an aqueous medium supplied with an oxygen-containing gas, oxidizing said material at a temperature and pressure sufficient to provide controlled autogenic and self-sustaining reaction, to produce an oxidized effluent which is removed from the reactor.

Materials especially adapted to oxidation by the process of the present invention are petroleum products, motor oils, diesel fuel, and the like; explosives, and propellants.

As a further variant on the systems described, the oxidized liquid exiting from the control valve 9 in the system of FIG. 2 can be directed back to the storage tank 6. This is advantageous in the case where a partial oxidation is conducted and the liquid still has appreciable chemical oxygen demand content. Returning and recycling this liquid eliminates the need for subsequent treatment prior to final disposal of the liquid, although it is necessary from time to time to treat the recycling liquid to remove precipitated and dissolved solids. This can be accomplished by evaporating a portion of the water and filtering off the solids.

The present invention can be employed in connection with any known application of wet air oxidation systems, including those designed for waste disposal, for byproduct or chemical recovery or for generation of useful energy.

The following examples will further illustrate the invention.

EXAMPLE 1

Oxidation of Diesel Fuel

Water was pumped at 3000 psig and 0.98 gallons per minute (gpm) through three heat exchangers, one of which was steam heated, into a set of two reactors in series. High pressure air was injected into the water stream prior to entering the first reactor, providing sufficient air to maintain a slight excess of oxygen in the exhaust vapor during oxidation. Start-up of the system involved pre-heating the reactors to at least 500° F. prior to fuel addition. When oxidation temperature was reached, Number 2 diesel fuel was pumped at a rate of 67 cc/minute into the air-water mixture just as it entered the reactor, using a variable rate pump. As soon as oxidation was initiated, the steam supply to the heat exchanger was shut off. The reaction temperature was maintained solely by the heat of oxidation of the diesel fuel (19,880 BTU/pound). The water entered the reactor at 554° F., and a reactor temperature of 603° F. was achieved using a 2.75 pounds of air per minute. Material entered the bottom and discharged at the top of each reactor. The oxidized effluent then passed through the two process heat exchangers (not steam-heated), a cooler and a pressure control valve, where the pressure was reduced to atmospheric conditions. The vapors and liquid were then separated and sampled. Oxidation of the diesel fuel was about 88 percent complete, the remaining chemical oxygen demand (COD) being present primarily in the form of volatile acids.

An attempt to oxidize diesel fuel according to the conventional system of FIG. 1 was unsatisfactory because it was not possible to maintain the fuel in an emulsion with water; therefore, the addition of the fuel to the reactor was very irregular and oxidizable material accumulated in various parts of the system resulting in dangerous overheating.

EXAMPLE 2

Oxidation of Propellant

Water at 2.25 gpm and air at 7.4 pounds per minute were passed through a heat exchanger and steam heater, entering the reactor at 800 psig and 390° F. Dry solid "double-base" propellant in granular form (1.0 mm diameter, specific gravity 1.6) having the composition:

51.0% nitrocellulose
38.5% nitroglycerin
7.5% triacetin (glyceryl triacetate)
2.0% lead salts
1.0% carbon was periodically slurried in 120° F. water and pumped to a cylindrical tank where the propellant settled. Excess water overflowed into another tank which supplied water to the high pressure propellant pump. The settled propellant slurry was continuously pumped at 4.45 lb./minute by a progressing cavity pump into the high pressure pump feed line where it was diluted to 11.4 percent by weight, in water. When discharge of water from the reactor began, pumping of the diluted propellant slurry into the reactor was commenced at a pipe velocity of 3.94 ft./sec., the propellant entering the reactor at 800 psig and 95° F. As propellant was introduced into the reactor, steam and the heat exchanger was shut off, and the heat of oxidation of the propellant served to maintain the reactor temperature greater than 400° F., the water-air mixture entering the reactor at 362° F. The reduction in chemical oxygen demand (COD) brought about by the wet oxidation was 97.9 percent.

Preferred conditions for satisfactory oxidation of the propellant are:

1. The propellant is at all times maintained in a wet condition to lessen chances of detonation.
2. The wet propellant enters the reactor at a temperature below 200° F. in order that oxidation will not occur prior to reaching the reactor.
3. The velocity of the propellant-water mixture in the pipelines exceeds 3.5 per second at all times to prevent settling and accumulation of dangerous quantities of propellant.
4. The propellant enters the reactor at a point above the air inlet. The turbulence produced by the air serves to help suspend the propellant granules and promote oxidation and uniform temperatures.
5. The reactor temperature exceeds 350° F. at all times when the propellant is fed to it, in order to prevent accumulation of unoxidized propellant.
6. The propellant feed rate is kept uniform.

When the propellant of the foregoing example was oxidized in the conventional way using the system of FIG. 1, it was not possible to maintain a constant propellant feed concentration into the reactor even with two agitators in the feed tank. Rapid temperature fluctuations occured, making reaction control difficult. In one run the slurry line from the heat exchanger to the reactor burst and emptied the reactor.

What is claimed is:

1. A process for oxidizing with an oxygen-containing gas in an aqueous medium in a sealed reactor an oxidizable material which is insoluble, immiscible and difficult to suspend or emulsify in water and selected from the group consisting of motor oils, diesel fuel, explosives and propellants, at a temperature and pressure sufficient to provide a controlled autogenic and self-sustaining oxidation reaction, which comprises passing said aqueous medium through a heat exchanger into said sealed reactor in order to heat the aqueous medium up to the required reaction temperature while supplying the reactor with an oxygen-containing gas, and at the same time injecting said oxidizable material directly into said reactor without heating said oxidizable material, thereby producing an oxidized effluent which is removed from the reactor.

2. A process according to claim 1 in which the oxidized effluent is recycled through the heat exchanger back to the reactor.

3. The process according to claim 1 in which the material subjected to oxidation is diesel fuel.

4. The process according to claim 1 in which the material subjected to oxidation is a propellant comprising a mixture of nitrocellulose and nitroglycerin.

* * * * *